(12) United States Patent
Romano et al.

(10) Patent No.: US 10,024,236 B2
(45) Date of Patent: Jul. 17, 2018

(54) ACOUSTICALLY OPTIMIZED AIR INLET

(71) Applicant: SNECMA, Paris (FR)

(72) Inventors: Pascal Romano, La Celle Saint Cloud (FR); Virginie Bonneau, Clamart (FR); Claude Sensiau, Paris (FR)

(73) Assignee: SNECMA, Paris (FR)

(*) Notice: Subject to any disclaimer, the term of this patent is extended or adjusted under 35 U.S.C. 154(b) by 247 days.

(21) Appl. No.: 14/761,786

(22) PCT Filed: Jan. 9, 2014

(86) PCT No.: PCT/FR2014/050026
§ 371 (c)(1),
(2) Date: Jul. 17, 2015

(87) PCT Pub. No.: WO2014/111642
PCT Pub. Date: Jul. 24, 2014

(65) Prior Publication Data
US 2015/0361885 A1    Dec. 17, 2015

(30) Foreign Application Priority Data

Jan. 18, 2013   (FR) ..................................... 13 50449

(51) Int. Cl.
*F02C 7/045*   (2006.01)
*F02K 3/062*   (2006.01)
(Continued)

(52) U.S. Cl.
CPC .............. *F02C 7/045* (2013.01); *B64D 33/02* (2013.01); *F02C 7/057* (2013.01); *F02K 3/062* (2013.01);
(Continued)

(58) Field of Classification Search
CPC ............. F02C 7/045; F02C 7/04; F02C 7/042
See application file for complete search history.

(56) References Cited

U.S. PATENT DOCUMENTS 3,533,486 A * 10/1970 Paulson .................. F02C 7/045
137/15.1
3,575,259 A *  4/1971 Wilkinson .............. F02C 7/045
137/15.1
(Continued)

FOREIGN PATENT DOCUMENTS

| EP | 1 607 603 A2 | 12/2005 |
| EP | 1 783 346 A2 | 5/2007 |
| EP | 2 072 779 A2 | 6/2009 |

OTHER PUBLICATIONS

Search Report dated Feb. 25, 2014, in corresponding International PCT Application No. PCT/FR2014/050026, filed on Jan. 9, 2014 (2 pages).

*Primary Examiner* — Patrick Maines
(74) *Attorney, Agent, or Firm* — Bookoff McAndrews, PLLC

(57) ABSTRACT

A nacelle structure (10) surrounding a fan, the structure comprising an air inlet (100) having an inside surface (100A) defining an air feed channel; and at least one ring (22) arranged in the air inlet and selectively movable between a deployed position in which the ring is moved radially inwards from the inside surface to provide an obstacle to shock waves coming from the fan, and a retracted position in which the ring is moved radially outwards from the deployed position so as to become flush with the inside surface and thus reconstitute the air feed channel.

8 Claims, 1 Drawing Sheet

(51) Int. Cl.
*F02C 7/057* (2006.01)
*B64D 33/02* (2006.01)

(52) U.S. Cl.
CPC .............. *B64D 2033/0206* (2013.01); *B64D 2033/0226* (2013.01); *F05D 2260/962* (2013.01)

(56) References Cited

U.S. PATENT DOCUMENTS

| | | | | |
|---|---|---|---|---|
| 3,618,699 A | * | 11/1971 | Evans | B64D 33/02 137/15.1 |
| 3,618,876 A | * | 11/1971 | Skidmore | F02C 7/042 137/15.1 |
| 3,662,556 A | * | 5/1972 | Poucher | F02C 7/045 137/15.1 |
| 3,664,612 A | * | 5/1972 | Skidmore et al. | B64D 33/02 137/15.1 |
| 4,023,644 A | | 5/1977 | Cowan et al. | |
| 5,177,957 A | * | 1/1993 | Grieb | B64D 33/02 244/53 B |

* cited by examiner

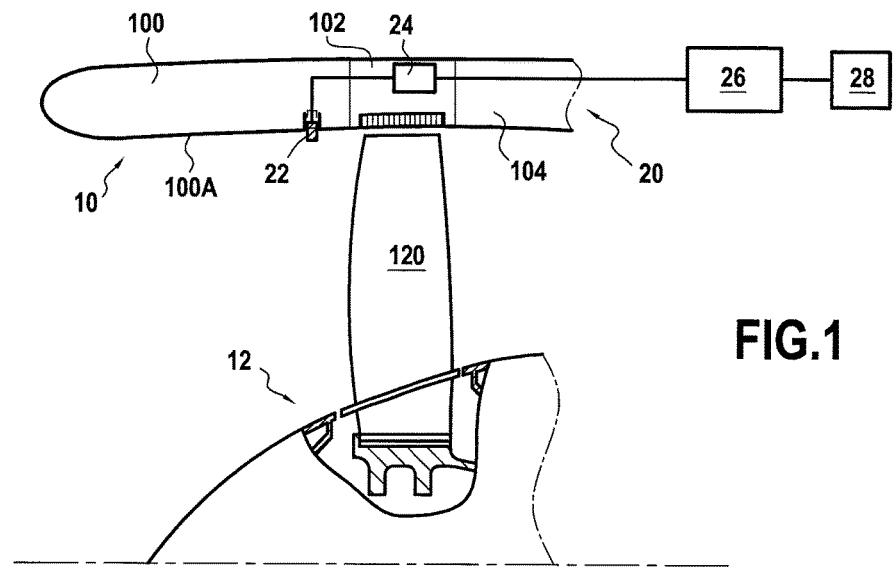
FIG.1
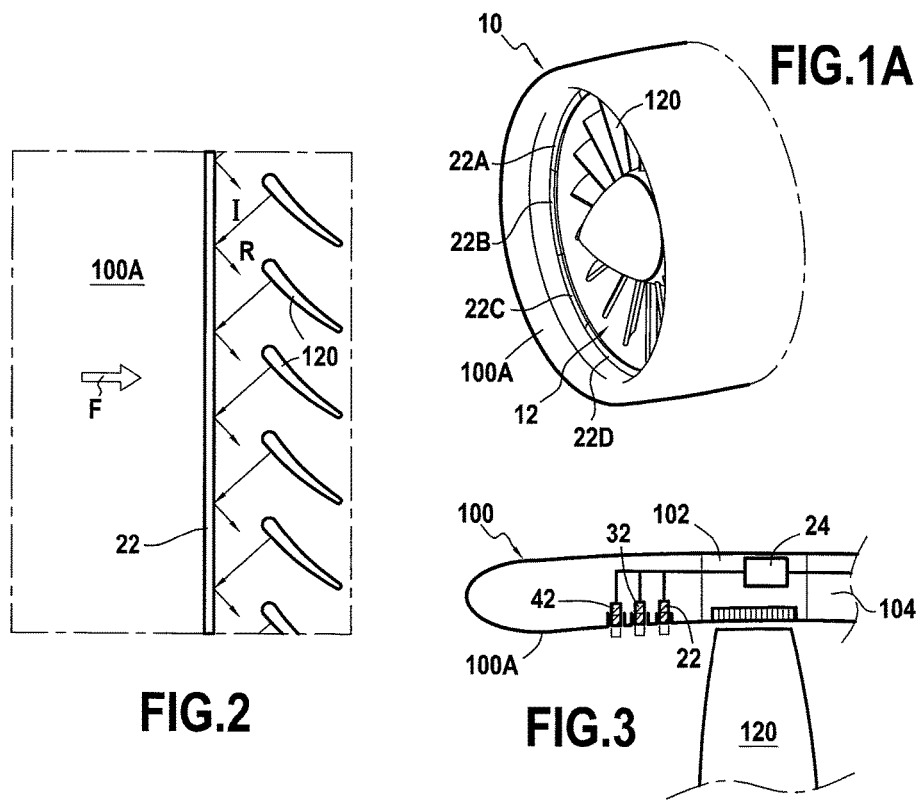
FIG.1A
FIG.2
FIG.3

ACOUSTICALLY OPTIMIZED AIR INLET

This application is the U.S. national phase entry under 35 U.S.C. § 371 of International PCT Application No. PCT/FR2014/050026, filed on Jan. 9, 2014, which claims priority to French Patent Application No. FR 1350449, filed on Jan. 18, 2013, the entireties of each of which are incorporated by reference herein.

BACKGROUND OF THE INVENTION

The present invention relates to the field of aviation, and more particularly to the air inlets of nacelles of turbine engines, i.e. airplane turboprops and turbojets.

In conventional manner, airplane engines are housed in nacelles situated at various locations on an airplane, in or under a wing, or indeed on the rear fuselage, for example, where such a nacelle has an air inlet oriented along its axis, with a generally annular leading edge at the front, and presenting a streamlined profile for guiding the air sucked in by the engine.

The sounds emitted by such engines originate mainly from the jet leaving the nozzle and also from the noise of the fan resulting from its blades rotating and moving past the fan casing.

At transonic speeds, where Mach numbers for the flow over the blades are locally greater than 1, shock waves form at the leading edges of the blades and propagate along spiral paths upstream from the inlet with decreasing amplitude, thereby creating noise with harmonics that are multiples of the blade pass frequency.

In order to limit the effects of the noise emitted forwards from the engine towards the ground, which noise is thus particularly audible during takeoff and landing operations, proposals have been made to use nacelles having an inlet profile of chamfered shape. The inlet plane of the engine thus slopes rearwards as a result of the bottom portion of the air inlet being lengthened. Nevertheless, such lengthening counters current constraints associated with weight, which tend on the contrary to shorten air inlets as much as possible.

Another solution, known in particular for reducing shock-related noise, is illustrated by application EP 1 783 346, which proposes modifying the fan casing by making grooves or splices therein so as to prevent shock waves from propagating in the air inlet. Unfortunately, those grooves lead to significant degradation of the acoustic performance of the inlet with other types of noise, and they also have a negative influence on the performance of the engine while cruising.

OBJECT AND SUMMARY OF THE INVENTION

The Applicant thus has the object of finding simple means for attenuating the noise caused by the fan of an airplane engine, and in particular shock-related noise on takeoff, but without degrading the aerodynamic performance of the engine under cruising conditions.

This object is achieved by a nacelle structure surrounding a fan, the structure comprising:
- an air inlet having an inside surface defining an air feed channel; and
- at least one ring arranged in said air inlet and selectively movable between a deployed position in which said at least one ring is moved radially inwards from said inside surface without becoming spaced apart therefrom so as to form a continuous obstacle to shock waves coming from said fan, and a retracted position in which said at least one ring is moved radially outwards from said deployed position so as to become flush with said inside surface and thus reconstitute said air feed channel.

With this retractable structure providing circumferential and radial continuity, it becomes possible to obtain a significant reduction or even suppression of the shock-related acoustic noise emitted by the fan blades, without having any influence on the performance of the engine under cruising conditions.

Advantageously, the nacelle structure includes an actuator connected to said at least one ring, a control unit in communication with said actuator, and a sensor, said sensor detecting first and second states corresponding respectively with said deployed and retracted positions, said control unit being configured to cause said at least one ring to move between said deployed and retracted positions in response to said first and second states detected by said sensor.

When said fan is an aircraft turbine engine fan, said first and second states correspond respectively to said aircraft performing takeoff or landing operations and to said aircraft performing cruising flight.

Preferably, said at least one ring is formed by a plurality of annular segments arranged circumferentially, and said at least one ring is located at a few tens of centimeters from the leading edges of blades of said fan, and presents height and thickness of a few millimeters.

In a particular embodiment, the nacelle structure has three rings that are axially spaced apart, each of said rings presenting thickness and height of no more than a few millimeters and said rings being spaced apart from one another by about ten centimeters.

The present invention also provides an aircraft turbine engine including the above-specified nacelle structure and it also provides a method of attenuating noise in an air feed channel of a nacelle structure surrounding a fan, the method comprising the steps consisting in:
- detecting a first state;
- in response to said first state, deploying at least one ring radially inwards from an inside surface of said nacelle structure defining an air feed channel in order to provide an obstacle to shock waves coming from said fan;
- detecting a second state different from the first stage; and
- in response to said second state, retracting said at least one ring radially outwards from said deployed position in order to become flush with said inside surface, and thus reconstitute said air feed channel.

BRIEF DESCRIPTION OF THE DRAWING

Other characteristics and advantages of the invention can be better understood on reading the following description of an embodiment of the invention given with reference to the accompanying drawing, in which:

FIG. 1 is a fragmentary longitudinal half-section view of a nacelle surrounding a turbine engine fan and provided with an acoustic noise reduction system of the invention;

FIG. 1A is a perspective view of the air inlet of the FIG. 1 nacelle;

FIG. 2 is a developed view of the air inlet of the FIG. 1A nacelle; and

FIG. 3 is a fragmentary longitudinal half-section view of the FIG. 1 nacelle fitted with a second embodiment of an acoustic noise reduction system of the invention.

DESCRIPTION OF A PREFERRED EMBODIMENT OF THE INVENTION

FIG. 1 is a fragmentary longitudinal half-section view of a nacelle 10 surrounding a fan 12 of a turbine engine power plant, e.g. an airplane turbojet. Conventionally, the nacelle comprises in the direction of the air stream passing therethrough (from left to right in FIG. 1 and referenced F in FIG. 2): a front annular portion or air inlet 100; an intermediate annular portion or fan casing 102; and a rear annular portion 104. The nacelle is generally secured to the structure of the airplane by means of a mast or pylon (not shown).

The air inlet and more particularly its inside surface 100A forming an air feed channel is shaped to ensure turbulence-free flow under various flying conditions: takeoff, cruising, and landing, starting from its leading edge and going up to the blades of the fan.

At present, interchanges between mechanical, aerodynamic, and acoustic engineers while designing fan blades are becoming more and more complex, given the high stakes and the ambitious and sometimes contradictory targets in each field. Furthermore, each parameter that is modified on a blade has different influences on its mechanical, aerodynamic, and acoustic performance, such that it becomes essential to find a technical solution that enables noise to be reduced without impacting the design of the fan blade.

The present invention provides this solution by means of an active system for reducing (or even eliminating) the noise that is emitted forwards by the air inlet, and in particular the shock-related noise coming from the fan, but without influencing performance under cruising conditions, where cruising conditions are key for the performance of the engine.

As shown in FIGS. 1 and 1A, this system 20 consists in incorporating at least one ring 22 in the air inlet 100 upstream from the blades 120 of the fan 12, which ring 22 is selectively movable between a deployed position in which it is moved radially inwards from the inside surface 100A of the air inlet and without becoming separated therefrom so as to form a continuous obstacle to shock waves coming from the fan, and a retracted position (dashed lines), in which the ring is moved radially outwards from the above-described deployed position so as to be flush with the inside surface, thereby reestablishing the streamlined profile of the air feed channel. The circumferential and radial continuity that is obtained in this way guarantees a barrier for shock waves, which are situated around 80% to 90% of the height of the airflow passage and all around its circumference.

The ring 22 is actuated by one or more actuators 24 connected to a control unit 26, itself in communication with a sensor 28 suitable for detecting first and second states corresponding respectively to the deployed and retracted positions of the ring. Thus, the control unit is configured to cause the ring to move between those two positions in response to the sensor detecting each of the first and second states. This makes it possible to deactivate the system 20 when cruising, during which aerodynamic performance would be degraded, and to use it only when acoustically justified (takeoff, landing, or approaching).

As shown in FIG. 1A, the ring 22 is made up of a plurality of annular segments (e.g. 22A, 22B, 22C, 22D) arranged circumferentially (with continuity in the azimuth direction) around the air inlet 100, with the number and the dimensions (deployed length) of segments depending on the dimensions of the fan on which the noise reduction system is installed, on the amplitude of the shock, and on its decay. For example, for a small-diameter engine (48 inches, i.e. about 1.2 meters (m)) for regional civil aviation in which shock-related noise is not critical since the speed of rotation of the engine is low, it appears sufficient to install only one ring. The ring may be located at a few tens of centimeters (typically 30 cm to 40 cm) from the leading edges of the fan blades and its height and thickness may be a few millimeters (typically in the range 1 mm to 5 mm). When suitably optimized, it is possible to obtain savings of several decibels in reducing noise from incident shocks I coming from the fan blades and shocks R reflected by the ring(s) (see FIG. 2).

FIG. 3 shows a second embodiment of the noise reduction system 20 in which the air inlet 100 has three rings 22, 32, 42 that are axially spaced apart upstream from the fan 12 and, as above, that can each occupy a deployed position (dashed lines) or a retracted position. In the deployed position, these three rings are preferably spaced apart from one another by about ten centimeters, with the ring closest to the fan possibly being situated at about thirty centimeters from the fan. For reasons of space, each ring presents thickness and height of no more than a few millimeters.

As in the above example, the rings are moved under the control of a control unit using the process that consists in: detecting a first state; in response to the first state, simultaneously (or successively) deploying the rings radially inwards from the inside surface of the air inlet defining an air feed channel so as to form an obstacle to shock waves coming from the fan; detecting a second state different from the first; and in response to the second state, retracting the rings radially outwards from the deployed position so that they become flush with the inside surface, thereby reconstituting the air feed channel.

When the fan is an aircraft turbine engine fan, these first and second states then correspond respectively to the aircraft performing takeoff or landing operations, and to the aircraft performing cruising flight.

The invention claimed is:

1. A nacelle structure surrounding a fan, the structure comprising:
    an air inlet having an inside surface defining an air feed channel; and
    at least one ring arranged in said air inlet and selectively movable between a fully deployed position in which said at least one ring is moved radially inwards from said inside surface, and a fully retracted position in which said at least one ring is moved radially outwards from said fully deployed position so as to become flush with said inside surface and thus reconstitute said air feed channel, wherein in said fully deployed position the at least one ring does not become spaced apart from said inside surface so as to form a circumferential and radial continuous obstacle to shock waves coming from said fan and reflected by the at least one ring.

2. A nacelle structure according to claim 1, wherein the nacelle structure further includes an actuator connected to said at least one ring, a control device in communication with said actuator, and a sensor, said sensor detecting first and second states corresponding respectively with said fully deployed and fully retracted positions, said control device being configured to cause said at least one ring to move between said fully deployed and fully retracted positions in response to said first and second states detected by said sensor.

3. A nacelle structure according to claim 2, wherein said fan is an aircraft turbine engine fan and said first and second states correspond respectively to said aircraft performing takeoff or landing operations and to said aircraft performing cruising flight.

4. A nacelle structure according to claim 3, wherein the nacelle structure further includes three rings that are axially spaced apart.

5. A nacelle structure according to claim 4, wherein each of said rings presents thickness and height of no more than a few millimeters and said rings are spaced apart from one another by about ten centimeters.

6. A nacelle structure according to claim 1, wherein said at least one ring is formed by a plurality of annular segments arranged circumferentially.

7. A nacelle structure according to claim 6, wherein said at least one ring is located at a few tens of centimeters from the leading edges of blades of said fan, and presents height and thickness of a few millimeters.

8. An aircraft turbine engine including a nacelle structure according to claim 1.

* * * * *